DISTORTION CORRECTION
Filed Sept. 1, 1953 2 Sheets-Sheet 1

INVENTOR.
Gordon L. Fredendall
BY [signature]
ATTORNEY

May 7, 1957 G. L. FREDENDALL 2,791,752

DISTORTION CORRECTION

Filed Sept. 1, 1953 2 Sheets-Sheet 2

INVENTOR.
GORDON L. FREDENDALL

BY [signature]

ATTORNEY

United States Patent Office 2,791,752

Patented May 7, 1957

2,791,752

DISTORTION CORRECTION

Gordon L. Fredendall, Huntingdon Valley, Pa., assignor to Radio Corporation of America, a corporation of Delaware Application September 1, 1953, Serial No. 377,867

1 Claim. (Cl. 333—28)

This invention relates generally to color television systems, and more particularly, to simultaneous color television systems of the subcarrier type.

In my U. S. Patent No. 2,330,965, patented Oct. 5, 1943, and entitled "Signal Transmission System," it was recognized that in signal transmission systems such as television systems, the phase relation between input and output of the various frequency components present in the video signals must be rigorously maintained because any relative phase displacement between these components results in a loss of definition in the reproduced picture. My aforesaid patent proposed generally a phase distortion compensating network in the modulating signal channel of the television transmitter such that its phase response characteristic is complementary to the phase distortion characteristic inherent in the modulated carrier portion of the transmission system. Various compensating networks were proposed therein for compensation of the phase distortions which were recognized as being introduced by such conventional components of the television system as the vestigial sideband filter of the transmitter and the bandpass filters generally employed in the I. F. amplifier of the television receiver.

The problem of compensating for such a phase distortion characteristic, or delay distortion characteristic (delay being the derivative of phase with respect to time), is of greater seriousness in color television systems of the subcarrier type, as for example, a system which accords with the present National Television System Committee (NTSC) signal specifications. In a proposed subcarrier type color television system which accords with the aforesaid NTSC signal specifications, color information is conveyed by sidebands of a color subcarrier. In the proposed system, for color information in a limited low frequency band, the color subcarrier is both phase and amplitude modulated to permit effective three-color reproduction of relatively large picture areas. For color information in a succeeding high frequency band, the color subcarrier is constant in phase but modulated in amplitude to permit effective two-color reproduction of the relatively small color details of the picture. As a broad band brightness signal is transmitted along with the modulated color subcarrier, the finest picture detail is effectively reproduced in black-and-white only.

In the aforementioned NTSC signal specifications the frequency of the color subcarrier is set at 3.579545 mc. Further in accordance with these signal specifications, the bandwidth of color signals for which the color subcarrier is both phase and amplitude modulated to permit three-color reproduction is effectively about 500 kc. To produce the phase and amplitude modulated subcarrier in this region the signal specifications require the modulation of two components of the subcarrier in phase quadrature.

The placing of the subcarrier frequency in the video frequency spectrum is essentially a matter of compromise between various factors which need not be considered in the present description. However, the result of placing the subcarrier frequency at about 3.58 mc. is of particular significance with respect to the present invention.

The conventional I. F. characteristic associated with most monochrome and color television receivers provides as sharp a cutoff in the region of frequencies approaching the associated sound carrier as is commercially feasible. The result is generally the appearance of a sloping shoulder in the characteristic for video frequencies of about 4 mc. and greater. One inherent result of the cutoff characteristic is the introduction of delay distortion for video frequencies in the region above 3 mc. Since, in accordance with the aforementioned NTSC signal specifications, the color subcarrier is located in this region, the distortion in the I. F. delay characteristic may be expected to produce quadrature component distortion in the color channels, and erroneous colors in transition regions may thus appear in the image reproduction.

In accordance with the present invention the quadrature component distortion effects introduced by the receiver's I. F. amplifier are substantially eliminated by providing equalizing means at the color television transmitter to introduce a compensating delay distortion. In a particular embodiment of the invention the equalizer comprises a four-section, constant resistance, all-pass, "stagger tuned" filter network. The delay equalizer provides a delay characteristic which is essentially complementary to the conventional distorting delay characteristic of the receiver's I. F. amplifier. The delay characteristic provided by this particular embodiment closely approximates, within the permitted tolerances, the delay characteristic proposed in revised section 20 of the NTSC field test signal specifications of July 21, 1953. Each section of the equalizer being of an all-pass type, the amplitude response of the equalizer is essentially flat for all video frequencies. The constant resistance feature of the filter permits direct termination of coaxial cables, limited only in practice by incidental reflections in the filter due to dissipation, distributed capacitance, and imperfections in line-up.

A delay equalizer in accordance with the present invention provides economical yet accurate means for preventing the introduction of quadrature component distortion in the I. F. amplifier of the color receiver. Accordingly it is a primary object of the present invention to provide apparatus for substantially reducing quadrature component distortion in a simultaneous color television system of the subcarrier type.

It is a further object of the present invention to provide means for compensating for the phase distortions introduced by the conventional I. F. characteristic of a television receiver.

It is an additional object of the present invention to provide a delay equalizer for use in a color television transmitter whereby delay distortion for video frequencies in the cutoff region of a color television receiver is substantially reduced.

Another object of the present invention is to provide a simplified, accurate and economical delay equalizer.

A still further object of the present invention is to provide the transmitting apparatus in a simultaneous color television system of the subcarrier type with a delay characteristic which is essentially complementary to the delay characteristic of the corresponding receiving apparatus whereby the overall delay characteristic is essentially flat for all signal frequencies.

Other objects and advantages of the present invention will become apparent to those skilled in the art upon a reading of the following detailed description and an inspection of the accompanying drawings in which.

Figure 1:
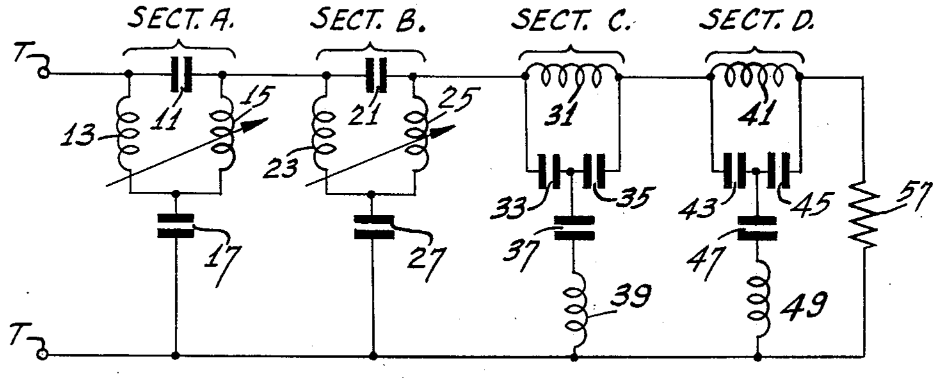
Figure 1 illustrates schematically a delay equalizer in accordance with an embodiment of the present invention.

Referring to Figure 1 in greater detail a delay equalizer in accordance with the present invention, and comprising four sections, A, B, C and D in tandem, is illustrated. It will be recognized that each section is of the type generally known as the bridged-T. The first two sections A and B comprise respective bridged-T networks in which the lateral arms comprise mutually coupled inductances 13, 15 and 21, 25, respectively, bridged by capacitances 11 and 21, respectively, and in which the base of each T comprises a capacitance 17 and 27, respectively. The subsequent sections C and D comprise bridged-T networks in which the lateral arms are made up of capacitances 33, 35 and 43, 45, respectively, bridged by respective inductances 31 and 41, and in which the base of each T comprises a series LC combination, 37, 39 and 47, 49, respectively. The equalizer is illustrated as terminated by a resistor 57.

Figure 2:
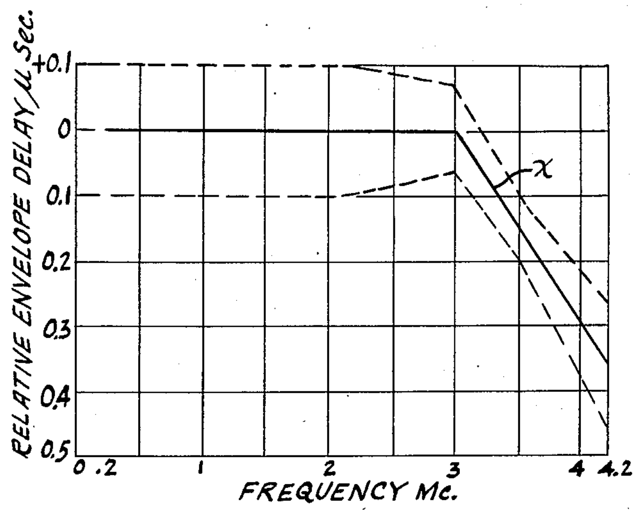
Figure 2 illustrates graphically the delay characteristic proposed in the revised NTSC field test specifications of July 21, 1953, and the tolerance limits therefor.
Figure 3:
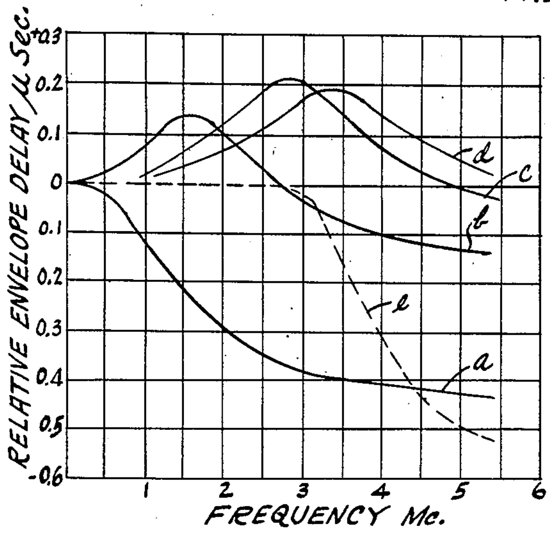
Figure 3 illustrates graphically the individual delay characteristics associated with the respective sections of the equalizer illustrated in Figure 1, as well as the overall delay characteristic of such an equalizer.

With particular assigned values to the elements of the sections described above, the delay characteristics illustrated in Figure 3 were obtained for the respective sections and for the overall combination. The curves illustrated in Figure 3 will be helpful in explaining the nature and principles of the present invention. However, to appreciate a particular application of the present invention, attention will first be directed to the delay characteristic and tolerances illustrated in Figure 2.

In the signal specifications which have been proposed by the National Television System Committee for adoption by the Federal Communications Commission as signal standards for color television transmission the following delay specifications have been included:

"A sine wave, introduced at those terminals of the transmitter which are normally fed the color picture signal, shall produce a radiated signal having an envelope delay, relative to the average envelope delay between 0.05 and 0.20 mc., of zero microseconds up to a frequency of 3.0 mc.; and then linearly decreasing to 4.18 mc. so as to be equal to $-0.17\mu$ sec. at 3.58 mc. The tolerance on the envelope delay shall be $\pm 0.05\mu$ sec. at 3.58 mc. The tolerance shall increase linearly to $\pm 0.1\mu$ sec., down to 2.1 mc., and remain at $\pm 0.1\mu$ sec. down to 0.2 mc. The tolerance shall also increase linearly to $\pm 0.1\mu$ sec. at 4.18 mc."

The curve labeled "*x*" in Figure 2 illustrates the delay characteristic set forth in the foregoing specification of the NTSC while the dotted line curves illustrate the tolerances proposed therein.

In a particular working example of the embodiment illustrated in Figure 1 the circuit constants were as follows: Capacitor 11—468 $\mu\mu$fd., capacitor 17—5980 $\mu\mu$fd., capacitor 21—468 $\mu\mu$fd., capacitor 27—2300 $\mu\mu$fd., capacitor 33—935 $\mu\mu$fd., capacitor 35—935 $\mu\mu$fd., capacitor 37—2300 $\mu\mu$fd., capacitor 43—831 $\mu\mu$fd., capacitor 45—831 $\mu\mu$fd., capacitor 47—1709 $\mu\mu$fd.; inductance 13—11.0 $\mu$h., inductance 15—11.0 $\mu$h., inductance 23—5.87 $\mu$h., inductance 25—5.87 $\mu$h., inductance 31—5.82 $\mu$h., inductance 39—2.63 $\mu$h., inductance 41—4.68 $\mu$h., and inductance 49—2.29 $\mu$h. The inductance 13 comprised 36¾ turns of No. 28 heavy formex wire on a form having an outside diameter of ½", while the inductance 15 comprised 29 turns on a form having an outside diameter of ⅝". The inductances 13 and 15 overlapped approximately ¼" and provided a series aiding inductance value of 33.7 $\mu$h. The inductance 23 comprised 23½ turns on a ½" form, while the inductance 25 comprised 19 turns on a ⅝" form. The inductances 23 and 25 were separated by a space of approximately 5/16" and provide a series aiding inductance value of 12.9 $\mu$h. The inductances 31 and 39 comprised 19 and 10 turns, respectively, on a ½" form, with substantially no coupling therebetween, while the inductances 41 and 49 comprised 14 and 9 turns, respectively, on a ½" form, also with substantially no coupling therebetween.

With values as indicated in the foregoing compilation the equalizer of Figure 1 provided a measured delay characteristic illustrated by curve "*e*" in Figure 3 which closely approximates the specified characteristic "*x*," well within the prescribed tolerances. As will be noted by inspection of the curves "*a*," "*b*," "*c*" and "*d*" of Figure 3 the various sections of the equalizer are effectively "stagger tuned" to obtain the desired overall delay characteristic. Section A provides a delay characteristic in which the delay for frequencies throughout most of the specified range is well below the reference low frequency delay, which is indicated by the ordinate labeled O. The succeeding sections B, C, and D, however, have successively spaced bands of maximum delay in which the delay is greater than the reference low frequency delay by peak amounts of predetermined different magnitudes. The net effect of the four sections in tandem is the provision of an overall delay characteristic which is essentially flat at the reference low frequency delay value through 3 mc., but which drops off linearly thereafter, up to at least 4.18 mc., with a slope that results in a delay of .17 microsecond at the approximate frequency of the color subcarrier, 3.58 mc.

The curves "*c*" and "*d*" illustrated in Figure 3 may alternatively be achieved by a physically realizeable pair of final sections which are schematically similar to sections A and B. However, for simplicity of construction and accurate adjustment the use of the type of bridged-T network illustrated for sections C and D is preferred since mutual coupling between inductances is not involved therein. It might then appear to be preferable to substitute for the illustrated forms of sections A and B, bridged-T networks of the type not involving mutual coupling. However, theoretical limitations dictate otherwise, for it may be demonstrated that sections of the type illustrated for C and D would require negative capacitances 37 and 47, not physically realizeable, to obtain the curves "*a*" and "*b*."

The equalizer illustrated in Figure 1 has an amplitude response which is theoretically 100 percent at all frequencies when incidental dissipation is not considered, since each section is effectively an all-pass network. This, of course, is of significant importance since quadrature component distortion cannot properly be eliminated if delay distortion is compensated for at the expense of amplitude distortion introduction. The equalizer illustrated in Figure 1 has an essentially constant resistance at all frequencies, this feature permitting direct termination of coaxial cables, limited only in practice by incidental reflections in the equalizer due to dissipation, distributed capacitance and imperfections in line-up.

Figure 4:
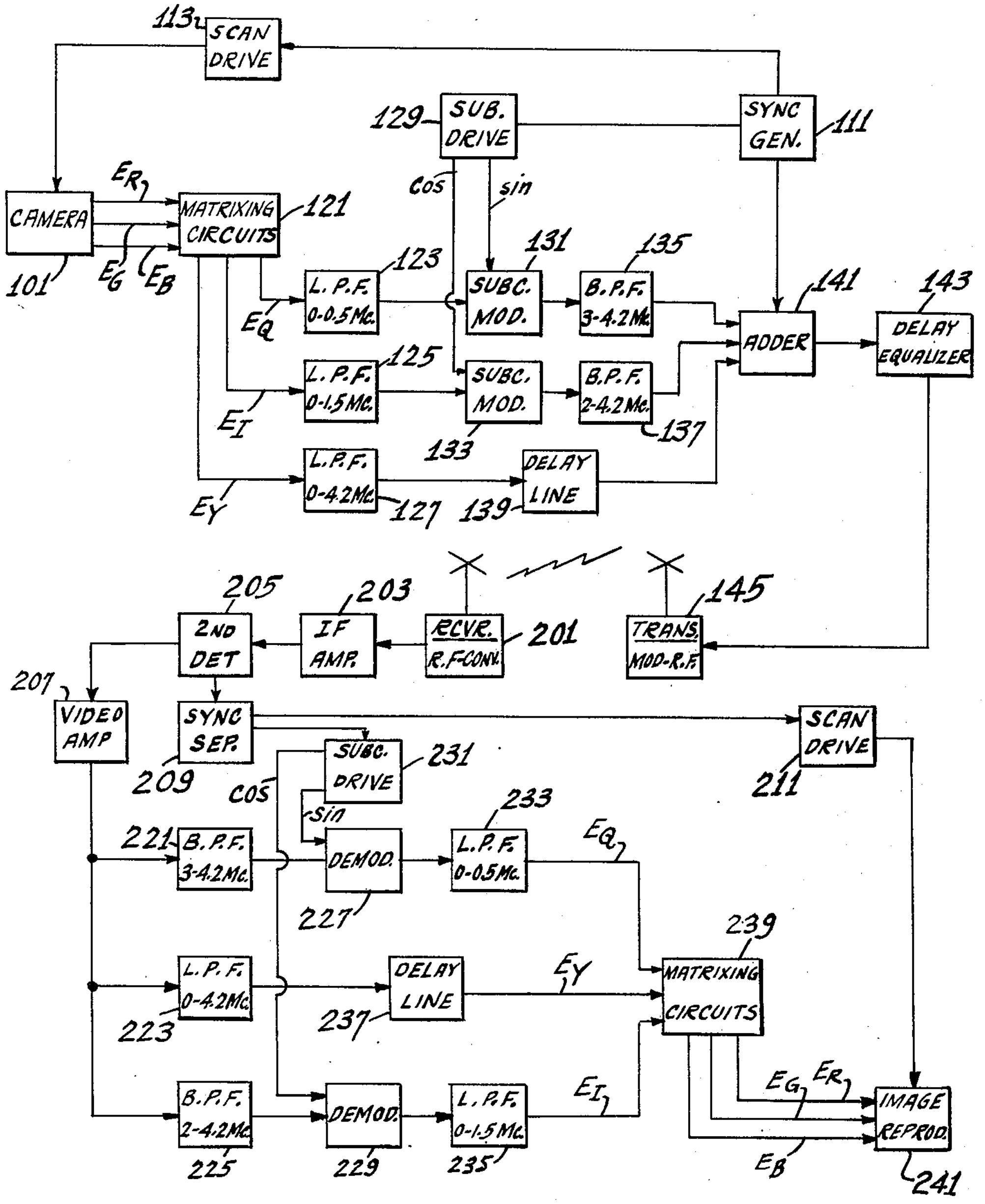
Figure 4 illustrates via a block diagram a color television system in which the delay equalizer of Figure 1 may function to advantage.

In Figure 4 a representative form of a presently contemplated subcarrier type color television system, which is in accord with the proposed signal specifications of the NTSC, is illustrated in a block diagram, with a delay equalizer (indicated by reference numeral 143) included to demonstrate its function in such a system and its relationship to the components thereof. The illustrated system accords generally with the principles and apparatus discussed in the article entitled "Principles and Development of Color Television Systems" by G. H. Brown and D. G. C. Luck, appearing in the June 1953 issue of the "RCA Review." While there is no need to discuss in detail the components and principles of operation of the illustrated system, for such information is presented in the aforementioend article and other such articles in this field, a general description will be made to aid in an understanding of the necessity for, and the salutary results of, the present invention.

A color television camera 101, its deflection circuits energized by scan drive apparatus 113 under conventional control of a sync generator 111, provides three component color signals, red, green and blue, indicated on the diagram as $E_R$, $E_G$ and $E_B$. The component color signals are combined, with suitable relative amplitudes and polarities, in the matrixing circuits 121, in accordance with principles and relationships discussed in the aforementioned article, to provide a brightness or monochrome signal $E_Y$ and two chroma signals $E_Q$ and $E_I$. The $E_Q$ signal is passed through a lowpass filter 123 having a .5 mc. cutoff, while the $E_I$ signal is passed through a lowpass filter 125 having a 1.5 mc. cutoff. Subcarrier driving apparatus 129, in appropriate synchronous relationship with the sync generator 111, provides two components, in phase quadrature, of a subcarrier wave (of a frequency equal to 3.579545 mc. in the NTSC signal specifications). One phase of the subcarrier wave is modulated by the narrow band $E_Q$ signal in the subcarrier modulator 131, while the other phase of the subcarrier is modulated by the wider band $E_I$ signal in the subcarrier modulator 133. The output of the modulator 131 passing through the filter 135 having a passband of 3 to 4.2, the output of the modulator 133 passing through a filter 137 having a passband of 2 to 4.2 mc., and the broad band monochrome signal $E_Y$ passing through the wide band (0 to 4.2 mc.) lowpass filter 127 are combined in an adder 141 with suitable synchronizing information from the generator 111 to provide a composite color television signal. A delay line 139 is included in the $E_Y$ signal channel to equal the delay imposed on the $E_Q$ and $E_I$ signals in the modulating and filtering operations associated therewith.

The composite television signal output of the adder 141 is passed through a delay equalizer 143, which may take the form illustrated in Figure 1 in accordance with the principles of the present invention. The output of the equalizer 143 is then fed to conventional television transmitting apparatus 145, which may include the usual carrier modulating apparatus, R. F. amplifying apparatus, etc.

The modulated carrier waves radiated by the transmitter 145 are illustrated as being received by conventional television signal receiving apparatus 201, which may include the usual R. F. tuner, converting apparatus, etc. The I. F. output of the signal receiver 201 is passed through an I. F. amplifier 203, which may be assumed to have the more or less conventional I. F. amplitude response characteristic. The video frequency signals are recovered from the modulated I. F. carrier output of amplifier 203 in the second detector 205 and amplified in the video amplifier 207. Synchronizing information is derived from the recovered signals in the sync separator 209 and utilized to synchronously control the receiver's scan drive apparatus 211 and subcarrier drive apparatus 231. The narrow band $E_Q$ signals and the wider band $E_I$ signals are recovered from the video signal output of amplifier 207 in respective color demodulator channels, which include bandpass filters 221 and 225 of respectively appropriate passbands, demodulators 227 and 229 receiving respectively appropriate phases of the output of the subcarrier drive apparatus 231, and lowpass filters 233 and 235 having the respectively appropriate narrow and wider band responses. The monochrome signal $E_Y$ appears in a separate channel, which includes a lowpass filter 223 having the appropriate wide band response of 0 to 4.2 mc. and a delay line 237 which equalizes for the delay imposed on the $E_Q$ and $E_I$ signals in the demodulating operations. The $E_Q$, $E_I$ and $E_Y$ signals are suitably combined in the matrixing circuits 239 of the receiver to reestablish the respective component color signals $E_R$, $E_G$ and $E_B$. These component color signals are then applied to the image reproducer 241, the deflection circuits of which are suitably energized by the synchronously controlled scan drive apparatus 211, to provide a color reproduction at the receiver of the image originally scanned by the camera 101.

A major contributor to delay distortion in the receiving equipment of the above described color television system is the I. F. amplifier 203. As previously noted, the conventional I. F. amplitude response characteristic includes a sloping shoulder in the region of video modulating frequencies approaching the sound carrier. This sloping drop in amplitude response generally commences at an intermediate frequency corresponding to about a 4 mc. modulating frequency. The result is that for video frequencies above about 3 mc., envelope delay increases substantially with frequency. It has been determined that for the average receiver this increase is approximately linear, i. e. the delay increases in this region at an approximately constant rate.

The delay equalizer of the present invention is included in the transmitting apparatus of the color television system to introduce a complementary relative decrease in delay in this region of video frequencies, so that the overall delay characteristic for the entire system will be essentially flat for all utilized video frequencies.

Having thus described the invention, what is claimed is:

In a color television system of the type wherein a composite signal including a modulated color subcarrier is transmitted, and wherein the apparatus adapted to receive and utilize said composite signal possesses a non-uniform delay characteristic for the frequencies of said composite signal, said delay characteristic including a region of essentially constant delay at the low frequency end of the signal frequency spectrum and a region of essentially linearly varying delay for a higher band of signal frequencies including said color subcarrier frequency, a delay compensation system comprising means for predistorting said composite signal prior to transmission in accordance with a delay characteristic which is substantially complementary to the delay characteristic of said signal receiving apparatus, comprising a plurality of all-pass networks in tandem, and means for passing said composite signal through said all-pass networks prior to the transmission of said composite signal, said plurality of all-pass networks including a pair of bridged-T networks, the lateral arms of each of said bridged-T networks comprising inductances having mutual coupling therebetween and being bridged by a capacitance, the base of each of said bridged-T networks comprising a capacitance, said plurality of all-pass networks also including an additional pair of bridged-T networks, the lateral arms of each of said additional bridged-T networks comprising respective capacitances and being bridged by an inductance, the base of each of said additional bridged-T networks comprising a series inductance-capacitance combination, the bridged-T networks of said first-named and said additional pairs having respectively different delay characteristics such that each has a different frequency of maximum delay, the frequencies of maximum delay for said first-named pair of bridged-T networks being toward the low frequency end of the signal frequency spectrum, the frequencies of maximum delay for said additional pair of bridged-T networks being toward the high frequency end of the signal frequency spectrum, the composite effect of the respective delay characteristics of said networks in tandem being such as to provide an essentially constant delay in said low frequency region and an essentially linearly varying delay over said high frequency band.

References Cited in the file of this patent

UNITED STATES PATENTS 1,770,422 Nyquist ---------------- July 15, 1940